United States Patent
Anders et al.

(10) Patent No.: US 6,614,279 B2
(45) Date of Patent: Sep. 2, 2003

(54) CLOCK RECEIVER CIRCUIT FOR ON-DIE SALPHASIC CLOCKING

(75) Inventors: Mark A. Anders, Hillsboro, OR (US); Ram K. Krishnamurthy, Portland, OR (US); Krishnamurthy Soumyanath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/941,457

(22) Filed: Aug. 29, 2001

(65) Prior Publication Data

US 2003/0042963 A1 Mar. 6, 2003

(51) Int. Cl.[7] .................................................. H03F 3/45
(52) U.S. Cl. ...................................... 327/291; 327/164
(58) Field of Search ................................ 327/333, 295, 327/563, 561, 164, 291, 562; 330/253, 255, 257

(56) References Cited

U.S. PATENT DOCUMENTS

| 5,446,396 | A | * | 8/1995 | Brehmer ........................ 327/66 |
| 5,465,058 | A | * | 11/1995 | Krenik et al. ................... 326/83 |
| 6,236,270 | B1 | * | 5/2001 | Takeuchi ..................... 330/253 |
| 6,294,940 | B1 | * | 9/2001 | Kiehl ........................... 327/291 |

* cited by examiner

*Primary Examiner*—Dinh T. Le
(74) *Attorney, Agent, or Firm*—Schwegman, Lundberg, Woessner & Kluth, P.A.

(57) ABSTRACT

A clock receiver circuit converts low amplitude, differential clock signal components received from a differential clock distribution medium into a full swing digital clock. The clock receiver circuit can be used as part of, for example, an on-die salphasic clock distribution system within a microelectronic device.

20 Claims, 4 Drawing Sheets

CLOCK RECEIVER CIRCUIT FOR ON-DIE SALPHASIC CLOCKING

FIELD OF THE INVENTION

The invention relates generally to microelectronic circuits and, more particularly, to clock receiver circuits for use therein.

BACKGROUND OF THE INVENTION

The operational speed of microprocessors and other microelectronic circuits (e.g., digital integrated circuits) is continuously increasing. As clock frequencies increase, proportionately lower clock skews are generally required. As such, clock distribution has become a major on-chip performance bottleneck within such circuits. One clock distribution strategy that has been successfully implemented in board level circuit designs (i.e., non-microelectronic circuits) to provide reduced clock skew is known as salphasic clocking. Salphasic clocking makes use of standing waves to distribute a clock signal within an electrical system. For various reasons, salphasic clocking has been difficult to implement on-die within microelectronic circuits. Therefore, practical methods and structures for implementing salphasic clocking within microelectronic circuits are generally desired.

DETAILED DESCRIPTION

Figure 1:
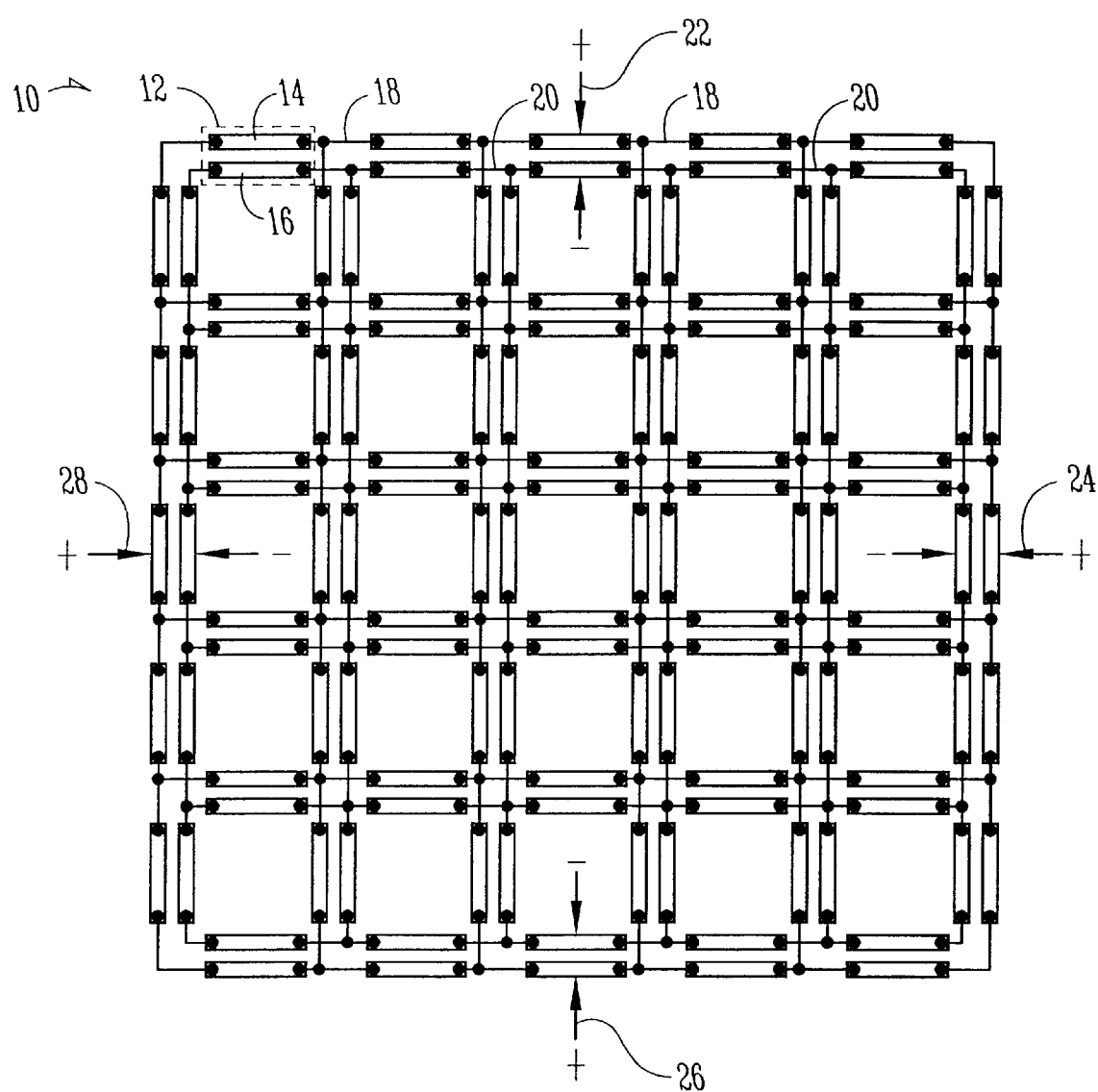
FIG. 1 is a top view illustrating a differential clock distribution grid in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to clock receiver circuits that can be used to receive clock signals from a clock distribution medium within a salphasic clock distribution system. It has been found that differential clock distribution structures offer enhanced operating performance when implementing salphasic clocking techniques on-die within a microelectronic system. A clock receiver architecture is provided that is capable of receiving a clock signal from such a differential structure and processing the signal for use by one or more clocked elements within an associated system. In one embodiment, a clock receiver circuit is provided that amplifies low swing differential signals from a salphasic clock medium to generate a full swing clock signal for an associated clocked element using a single stage of amplification. The clock receiver circuit may also display a delay versus input amplitude characteristic that is capable of preventing some or all of the skew that is often associated with position dependent signal amplitudes in salphasic distribution systems. In at least one application, the inventive principles are implemented as part of an on-die salphasic clocking system within a microelectronic device. Use of the inventive principles can lead to substantial improvements in clock skew within a microelectronic device while also reducing clock distribution power within the device. The inventive principles also have application within off-die signal distribution arrangements.

As used herein, the term "clocked element" refers to a circuit, component, subsystem, or similar structure within an electronic system that is clocked during normal system operation. For example, in a microprocessor some common clocked elements include: adders, caches, register files, multipliers, control logic, and others.

As described previously, salphasic clocking uses standing waves on a transmission medium to distribute a clock signal to multiple points within a system with relatively low skew. FIG. 1 is a diagram illustrating a salphasic clock grid 10 that may be implemented on-die in accordance with an embodiment of the present invention. As illustrated, the salphasic clock grid 10 is a differential structure that includes a number of differential interconnect segments 12. Each of the segments 12 includes first and second differential clock lines 14, 16. The interconnect segments 12 are connected together in a grid pattern that is used to distribute a clock signal to a number of clocked elements within a corresponding microelectronic device (e.g., a microprocessor) in a salphasic manner. The first differential clock line 14 of each interconnect segment 12 is conductively coupled to the first differential clock line 14 of each other interconnect segment 12 of the clock grid 10 using conductive links 18. Similarly, the second differential clock line 16 of each interconnect segment 12 is conductively coupled to the second differential clock line 16 of each other interconnect segment 12 of the clock grid 10 using conductive links 20. The conductive links 18, 20 may include, for example, trace portions on other layers of the die (and corresponding via connections).

To generate standing waves on the clock grid 10, the grid is fed a differential clock signal at four different locations 22, 24, 26, 28 thereon. Buffer units having small signal, differential outputs can be used to drive the clock grid 10 at these locations. The resulting standing wave pattern will depend on a number of factors including: the phasing of the four drive signals, the dimensions of the clock grid 10, and the frequency of the clock signal. Preferably, the standing wave pattern will have large regions where clock signal phase is highly position independent. Thus, the clocked elements can be connected to the clock grid 10 anywhere within these regions to achieve relatively low skew. In at least one embodiment, the signal phase is position independent for the entire clock grid 10. In one approach, relatively low amplitude (e.g., small signal) sinusoidal signals are used to form the standing waves on the clock grid 10. Other signal types (e.g., higher amplitude signals) can alternatively be used. It should be appreciated that the inventive principles can be used in conjunction with any differential clock distribution structure (e.g., differential tree structures, random differential structures, etc.) and are not limited to use with the particular grid arrangement of FIG. 1.

Figure 2:
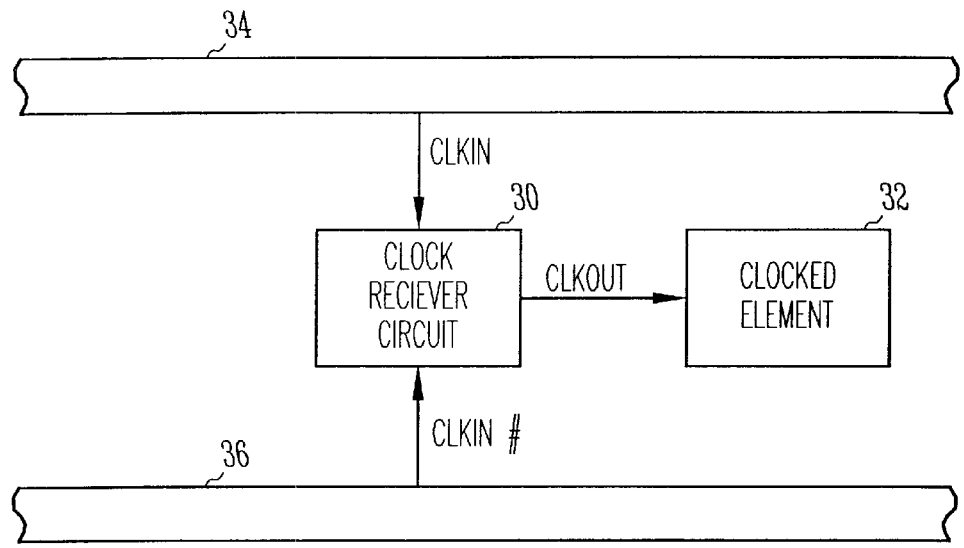
FIG. 2 is a block diagram illustrating a clock receiver circuit coupled to a differential clock medium to generate a clock signal for a clocked element in accordance with an embodiment of the present invention.

In a typical scenario, clocked elements are coupled to the clock grid 10 at a plurality of locations. For a particular clocked element, a clock receiver circuit may be provided for sensing and processing the clock signal from the clock grid 10 for use by the clocked element. FIG. 2 is a diagram illustrating the connection of a clocked element 32 to a differential clock distribution medium using a clock receiver circuit 30. As illustrated, the clock receiver circuit 30 is coupled to first and second differential signal lines 34, 36 of the clock distribution medium (e.g., lines 14 and 16 of grid 10). The clock receiver circuit 30 derives a first differential input signal component (CLKIN) from a point on the first differential signal line 34 and a second differential input signal component (CLKIN#) from a corresponding point on the second differential signal line 36. The clock receiver circuit 30 processes the first and second differential input signals to generate an output clock signal (CLKOUT) for delivery to the clocked element 32. A similar arrangement may be used for each clocked element connected to the clock grid 10.

Figure 3:
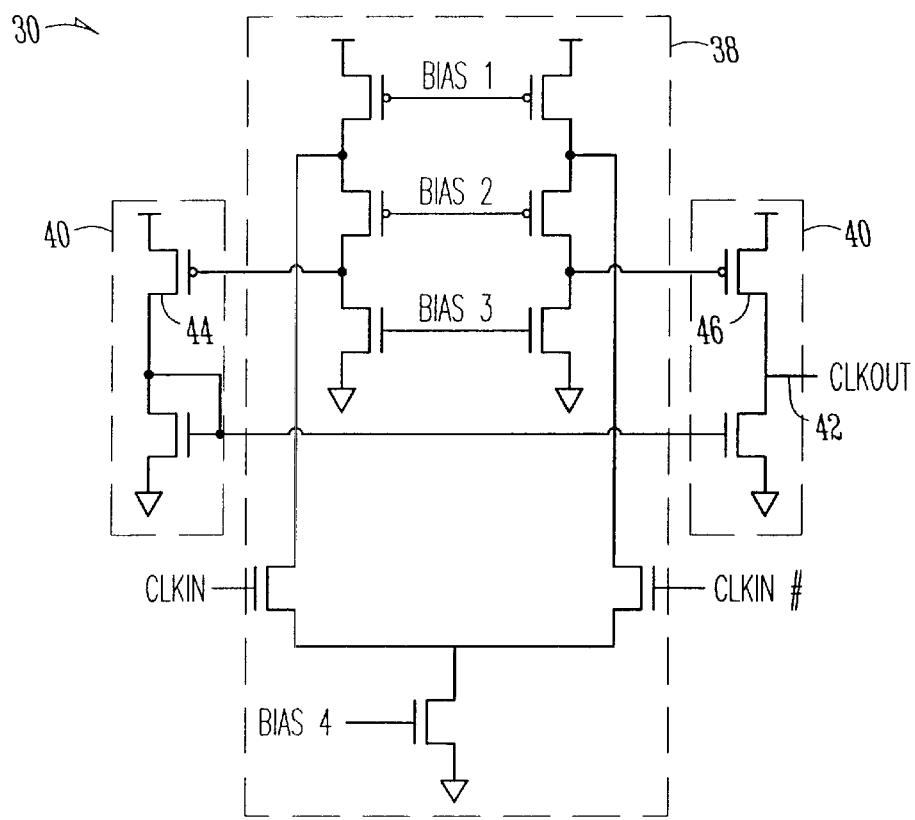
FIG. 3 is a schematic diagram illustrating a clock receiver circuit in accordance with an embodiment of the present invention.
Figure 4:
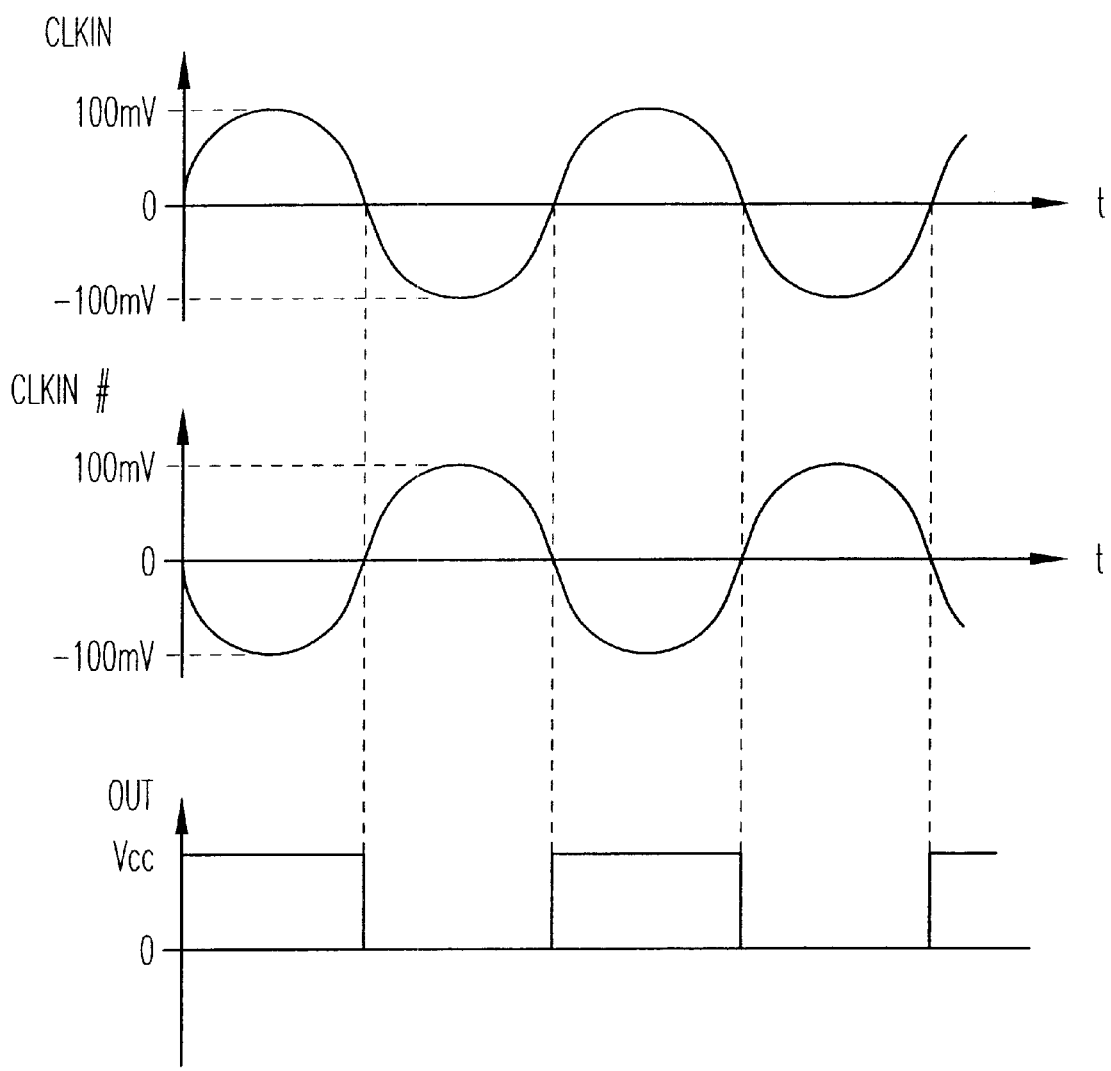
FIG. 4 is a timing diagram illustrating the operation of the clock receiver circuit of FIG. 3 in accordance with an embodiment of the present invention.

FIG. 3 is a schematic diagram illustrating a clock receiver circuit 30 in accordance with an embodiment of the present invention. As illustrated, the clock receiver circuit 30 includes an amplification portion 38 and an output portion 40. The amplification portion 38 of the clock receiver circuit 30 is operative for sensing and amplifying signal components on the first and second differential signal lines 34, 36. The amplified signal components are then delivered to the output portion 40 of the clock receiver circuit 30 which uses the amplified components to generate a full swing (i.e., rail to rail) square wave output clock. In at least one embodiment, the standing waves on the clock distribution medium are generated using relatively low swing (small signal) sinusoidal signals. The clock receiver circuit 30 of FIG. 3 is capable of amplifying these low swing sinusoidal signals and converting them to a full swing square wave clock signal. FIG. 4 is a timing diagram illustrating the relationship between the differential input signal components (CLKIN, CLKIN#) and the output clock signal (CLKOUT) in accordance with an embodiment of the present invention. As shown, each of the differential input signal components has a magnitude of approximately 100 millivolts (mV) while the output clock has a magnitude equal to the power supply voltage (i.e., Vcc) of the system. In at least one approach, the output clock signal will have an amplitude that is at least three times that of the differential input signal components.

In the illustrated embodiment, the amplification portion 38 of the clock receiver circuit 30 is implemented using a folded cascode differential amplifier architecture. The folded cascode differential amplifier uses a common source input pair in conjunction with a common gate cascode output pair having an opposite device type to perform signal amplification. In the illustrated embodiment, the input pair consists of N-channel metal-oxide-semiconductor (NMOS) devices while the output pair includes P-channel metal-oxide-semiconductor (PMOS) devices. The opposite arrangement is also possible. The folded cascode architecture was selected because of its high gain and low power characteristics. As will be appreciated, many alternative amplifier architectures can also be implemented in accordance with the present invention.

As described above, the output portion 40 of the clock receiver circuit 30 generates a full swing clock signal (CLKOUT) using the amplified differential signal components. In the illustrated embodiment, the output portion 40 of the clock receiver circuit 30 behaves as a controlled switch that switches the output terminal 42 of the clock receiver circuit 30 between the two power rails of the system (e.g., Vcc and ground). The output portion 40 performs this switching function in response to the amplified differential clock signal components generated by the amplification portion 38. In this manner, the clock receiver circuit 30 generates a full swing output clock signal for delivery to the associated clocked element after a single stage of amplification. In one implementation, a single clock receiver circuit 30 is provided for each clocked element in the system. Other arrangements are also possible. The transistor sizes used for a particular clock receiver circuit may be selected based upon the requirements of the clocked element(s) to be driven by the circuit.

In at least one embodiment of the present invention, some of the signal gain provided by the clock receiver circuit 30 is sacrificed to achieve an enhanced power supply rejection ratio (PSRR). PSRR is a measure of the insensitivity of a circuit's output to variations in supply voltage. PSRR can often be increased by decreasing transistor size within a circuit. However, a reduction in transistor size will typically reduce circuit gain. Because of the high gain of the folded cascode differential amplifier, some of the gain of the clock receiver circuit 30 can be traded for an enhanced PSRR. By trading gain for PSRR, it may be possible to reduce jitter compared to complementary metal-oxide-semiconductor (CMOS) buffers.

Clock power typically represents a significant portion of the overall power consumed within a digital processing device. For this reason, it is desirable that clock power be reduced as much as possible. In one embodiment of the present invention, the output portion of the clock receiver circuit 30 is operated at a reduced supply voltage (i.e., reduced Vcc) to save on clock power. With reference to FIG. 3, for example, the supply voltage coupled to the two output PMOS devices 44, 46 of the clock receiver circuit 30 may be reduced so that a full swing clock at reduced Vcc is achieved at the output of the circuit. By reducing these voltage levels, the clock power consumed within the clocked elements is reduced quadratically. The clocked elements being driven with the reduced Vcc clock signals will typically require design modifications to permit operation at the reduced voltage level. This may involve the use of special latches or flip flops within the corresponding clocked elements. The reduced voltage clock may be limited to driving NMOS transistors as the lower voltage swing may not be capable of turning off PMOS devices.

Referring back to FIG. 2, the standing waves that are present on the first and second differential signal lines 34, 36 will have amplitudes that vary with position. Because these lines 34, 36 are typically lossy, traveling waves will also be present on the lines that also have position dependent amplitudes. These traveling waves will introduce skew into the system. In accordance with one aspect of the invention, a clock receiver circuit is provided that can cancel some or all of the skew resulting from the traveling waves. For example, when a traveling wave having a position dependent amplitude is incident upon an input of the clock receiver circuit 30 of FIG. 3, skew is created within the circuit. This skew is opposite to that of the traveling wave induced skew of the lines and thus partially or fully cancels it. This skew cancellation feature is adjustable to some extent by modifying transistor sizes within a receiver to achieve an optimized cancellation.

Figure 5:
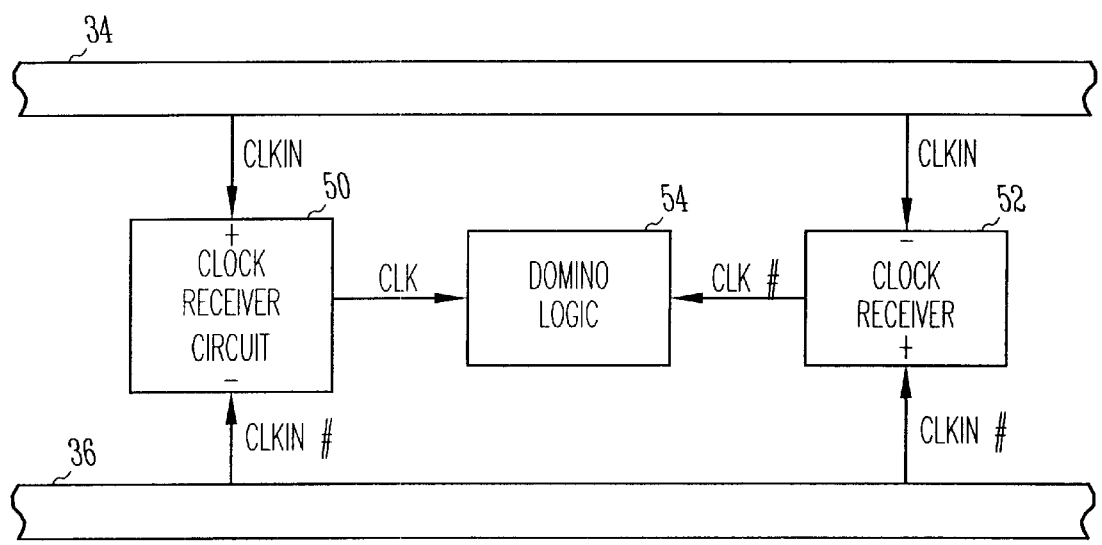
FIG. 5 is a block diagram illustrating the generation of true and complement clock signals in accordance with an embodiment of the present invention.

Another significant feature of the clock receiver circuit 30 of FIG. 3 is the ease with which a complementary (inverted) clock signal is achieved. As is well known, in many applications (e.g., domino logic and other dynamic circuitry) true and complement clock signals are required. In the past, a digital inverter unit was typically implemented to generate the complement clock, resulting in a one inverter delay offset between the true and complementary clocks. In accordance with one aspect of the present invention, a complementary clock signal is achieved without the use of an inverter. That is, a complementary clock signal is generated by simply changing the inputs of the clock receiver circuit between the differential signal lines of the clock transmission medium. Thus, a true clock signal is achieved by connecting a clock receiver circuit to a differential clock medium in one orientation and a complementary clock signal is achieved by connecting another clock receiver circuit to the differential clock medium in an opposite orientation. FIG. 5 is a diagram illustrating this feature. As shown, a first clock receiver circuit 50 has a positive differential clock input (+) coupled to a first differential clock line 34 and a negative differential clock input (−) coupled to a second differential clock line 36 to generate a true clock signal (CLK) for domino logic 54. A second clock receiver circuit 52 has a positive clock input (+) coupled to the second differential clock line 36 and a negative clock input (−) coupled to the first differential clock line 34 to generate a complementary clock signal (CLK#) for the domino logic 54. Because an inverter circuit is not used, highly synchronized true and complement clock signals can be achieved.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A clock receiver circuit comprising:

first and second differential input nodes to receive first and second differential input signals from a clock distribution medium, said first and second differential input signals being sinusoidal;

a differential amplifier, coupled to said first and second differential input nodes, to amplify a difference between the first and second differential input signals to generate first and second amplified differential signals; and an output stage to generate an output clock signal using the first and second amplified differential signals, said output stage comprising a switch that is controlled by the first and second amplified differential signals to generate the output clock signal, wherein said differential amplifier and switch are configured and biased such that the output clock signal is a square wave.

2. The clock receiver circuit of claim 1 wherein:

said differential amplifier includes a folded cascode differential amplifier.

3. The clock receiver circuit of claim 1 wherein:

said output clock signal has an amplitude that is at least three times an amplitude of said first and second differential input signals.

4. The clock receiver circuit of claim 1 wherein:

said output stage generates a square wave output clock signal that alternates between first and second supply potentials.

5. The clock receiver circuit of claim 1 wherein:

said clock distribution medium is a salphasic clock distribution medium that uses standing waves to distribute a clock signal during operation of the clock receiver circuit.

6. The clock receiver circuit of claim 5 wherein:

said clock receiver circuit and said salphasic clock distribution medium are implemented on a common microelectronic die.

7. A microelectronic die comprising:

a clock distribution medium having first and second differential signal lines, said first differential signal line to carry a first differential signal component and said second differential signal line to carry a second differential signal component, said first and second differential signal components being sinusoidal; and a clock receiver circuit coupled to said first and second differential signal lines to generate an output clock signal using said first and second differential signal components, said clock receiver circuit including a differential amplifier coupled to said first and second differential signal lines to amplify a difference between said first and second differential signal components to generate first and second amplified differential signal components and an output portion to generate a square wave output clock signal using said first and second amplified differential signal components, said output portion comprising a switch that is controlled by the first and second amplified differential signal components wherein the differential amplifier and switch are configured and biased to generate the square wave output clock signal.

8. The microelectronic die of claim 7 wherein:

said differential amplifier includes a folded cascode differential amplifier.

9. The microelectronic die of claim 7 wherein:

said differential clock distribution medium is part of a salphasic clock distribution network.

10. The microelectronic die of claim 7 wherein:

said clock receiver circuit includes a single amplification stage.

11. The microelectronic die of claim 7 wherein:

said output portion generates a full swing, square wave output clock signal that alternates between first and second supply potentials.

12. The microelectronic die of claim 11 wherein:

said microelectronic die uses a supply potential Vcc to power some of the circuitry therein, wherein said output portion of said clock receiver circuit uses a first supply potential that is less than Vcc and a second supply potential that is a ground potential to generate said output clock signal to conserve clock power.

13. The microelectronic die of claim 7 wherein:

said microelectronic die is part of a microprocessor unit.

14. The clock receiver circuit of claim 1 wherein said output stage comprises:

a first transistor to controllably couple an output node of the clock receiver circuit to a first supply potential; and a second transistor to controllably couple said output node of the clock receiver circuit to a second supply potential, said second supply potential being different from said first supply potential.

15. The microelectronic die of claim 7 wherein:

said switch alternately couples an output node of said clock receiver circuit between first and second supply potentials in response to said first and second amplified differential signal components.

16. A microelectronic die comprising:

a salphasic clock distribution grid to distribute a clock signal to multiple clocked elements using standing waves, said salphasic clock distribution grid including first and second differential signal lines to each support a respective sinusoidal standing wave; and a clock receiver circuit, coupled to said first and second differential signal lines of said salphasic clock distribution grid, to produce a square wave output clock signal for a clocked element using first and second differential signal components received from said salphasic clock distribution grid, wherein a differential amplifier and switch are configured and biased such that the produced output clock signal is a square wave.

17. The microelectronic die of claim 16 wherein:

said clock receiver circuit comprises a differential amplifier to amplify a difference between said first and second differential signal components to generate first and second amplified differential signal components and an output portion to generate said square wave output clock signal using said first and second amplified differential signal components, said output portion comprising a switch that is controlled by said first and second amplified differential signal components.

18. The microelectronic die of claim 17 wherein said output portion includes:

said switch alternately couples an output node of said clock receiver circuit between first and second supply potentials in response to said first and second amplified differential signal components.

19. The microelectronic die of claim 18 wherein:

said first supply potential is Vcc and said second supply potential is a ground potential.

20. The microelectronic die of claim 17 wherein:

said microelectronic die uses a supply potential Vcc to power some of the circuitry therein, wherein said first supply potential used by said output portion is less than Vcc and said second supply potential used by said output portion is a ground potential.

* * * * *